United States Patent
Desbarats

(10) Patent No.: US 8,326,890 B2
(45) Date of Patent: Dec. 4, 2012

(54) SYSTEM AND METHOD FOR ASSISTING COMPUTER USERS TO SEARCH FOR AND EVALUATE PRODUCTS AND SERVICES, TYPICALLY IN A DATABASE

(75) Inventor: Nick Desbarats, Ottawa (CA)

(73) Assignee: Choicebot, Inc. (CA)

( * ) Notice: Subject to any disclaimer, the term of this patent is extended or adjusted under 35 U.S.C. 154(b) by 279 days.

(21) Appl. No.: 11/741,106

(22) Filed: Apr. 27, 2007

(65) Prior Publication Data

US 2007/0255696 A1    Nov. 1, 2007

Related U.S. Application Data

(60) Provisional application No. 60/795,560, filed on Apr. 28, 2006.

(51) Int. Cl.
    *G06F 17/30* (2006.01)
(52) U.S. Cl. ........................................................ 707/805
(58) Field of Classification Search .................. None
    See application file for complete search history.

(56) References Cited

U.S. PATENT DOCUMENTS

| | | |
|---|---|---|
| 6,499,029 B1 | 12/2002 | Kurapati et al. |
| 6,578,022 B1 | 6/2003 | Foulger et al. |
| 6,651,044 B1 | 11/2003 | Stoneman |
| 6,651,045 B1 | 11/2003 | Macaulay |
| 6,662,177 B1 | 12/2003 | Martino et al. |
| 6,721,606 B1 | 4/2004 | Kaji et al. |
| 6,745,168 B1 | 6/2004 | Enomoto |
| 6,772,190 B2 | 8/2004 | Nodjat et al. |
| 6,799,169 B1 | 9/2004 | Coffman et al. |
| 6,826,541 B1 * | 11/2004 | Johnston et al. ............. 705/36 R |
| 6,826,549 B1 | 11/2004 | Marks et al. |
| 6,920,459 B2 | 7/2005 | Dedhia et al. |
| 7,103,591 B2 * | 9/2006 | Asobayire et al. ..................... 1/1 |
| 7,596,505 B2 * | 9/2009 | Keil et al. .................... 705/7.32 |
| 7,698,161 B2 * | 4/2010 | Keil et al. .................... 705/7.32 |
| 2002/0026390 A1 | 2/2002 | Ulenas et al. |
| 2002/0107861 A1 * | 8/2002 | Clendinning et al. ........ 707/101 |
| 2003/0200186 A1 | 10/2003 | Abrahams |
| 2004/0034652 A1 | 2/2004 | Hofmann et al. |
| 2004/0177051 A1 | 9/2004 | Bridges et al. |
| 2005/0021482 A1 | 1/2005 | Kim et al. |
| 2005/0131866 A1 | 6/2005 | Badros et al. |
| 2005/0216460 A1 | 9/2005 | Yoon et al. |

(Continued)

OTHER PUBLICATIONS

Evaluating Example-Based Search Tools (Scientific Paper) Pearl Huanz; Pratyush Kumar Proceedings of the 5th ACM Conference on Electronic Commerce Table of Contents ACM Press New York, NY, USA; Publication: 2004 pp. 208-217 http://portal.acm.org/citation.cfm?id=988804.

(Continued)

*Primary Examiner* — Bai D. Vu
(74) *Attorney, Agent, or Firm* — McDonnell Boehnen Hulbert & Berghoff LLP

(57) ABSTRACT

A search tool for an electronic information resource, which is typically a database of products and services, is provided. The search tool can be used to assist a user to search, evaluate and select anything capable of being chosen. The search tool includes a user interface which includes a scale, a user input element and a potential attributes area. The user input element includes one or more indicators enabling a user to associate a point along the scale with the user's preference for each potential attribute.

20 Claims, 7 Drawing Sheets

U.S. PATENT DOCUMENTS

| | | | |
|---|---|---|---|
| 2005/0222989 | A1 | 10/2005 | Haveliwala et al. |
| 2005/0278198 | A1 | 12/2005 | Huxol et al. |
| 2006/0004734 | A1* | 1/2006 | Malkin et al. ............ 707/4 |
| 2006/0128263 | A1* | 6/2006 | Baird ............ 446/321 |
| 2006/0235768 | A1* | 10/2006 | Tatum et al. ............ 705/28 |
| 2007/0073803 | A1* | 3/2007 | Terrill et al. ............ 709/203 |

OTHER PUBLICATIONS

Just-in-Time Knowledge Management (Scientific Paper) Larry Kerschberg & Hanjo Jeong; E-Center for E-Business, Department of Information & Software Engineering, George Mason University Fairfax, VA, USA; http://eceb.gmu.edu/pubs/JIT_KM_Kerschberg_Jeong.pdf.

User Interface Issues for Browsing Digital Video (Scientific Paper) Hyowon Lee & Alan F. Smeaton; School of Computer Applications; Dublin City University Dublin, Ireland; Jonathan Furner, Department of Information Studies; Graduate School of Education & Information Studies, University of California Los Angeles, CA, USA; http://www.computing.dcu.ie/research/papers/1999/0899.pdf.

http://www.guidester.com.

http://base.google.com/base/s2?a_n0=products&a_y0=9&hl=en&gl=US.

http://www.igodigital.com/.

http://www.transparensee.com.

http://shopping.yahoo.com/smartsort/.

http://www.bluenile.com/diamond_search.asp.

http://www.ford.com/en/vehicles/vehicleShowroom/default.htm.

http://www.aggregateknowledge.com.

http://www.celebros.com.

http://www.endeca.com.

\* cited by examiner

List view
Grid view | List view

410 — 46 Glen Ave. [pro's & cons] (Excellent choice)
412 — 77 Molday St. [pro's & cons] (Very good choice)
414 — [upload a pic] 4483 Elmwood Cres. [pro's & cons] (Good choice)
416 — 227 Fisher Ave. [pro's & cons] (Neutral choice)
418 — 31 Sylvester St. [pro's & cons] (Mediocre choice)
420 — 26 Atrium Dr. [pro's & cons] (Very poor choice)

▶ Products with 1 "fatal flaw"

422 — 1227 Prince Arthur Rd. [pro's & cons] ? Price ($499,000)
424 — 10 Tecumseh Dr. [pro's & cons] ? Curb appeal (Ugly)

▶ Products with 2 "fatal flaws"

426 — 144 St. Mary St. [pro's & cons] ? Parking spaces (none), ? Square footage (1550 sq. ft.)

FIG. 6

SYSTEM AND METHOD FOR ASSISTING COMPUTER USERS TO SEARCH FOR AND EVALUATE PRODUCTS AND SERVICES, TYPICALLY IN A DATABASE

CROSS-REFERENCE TO RELATED APPLICATIONS

This application claims the benefit of U.S. provisional patent application Ser. No. 60/795,560, filed on Apr. 28, 2006, the entire contents of which are hereby incorporated herein by reference.

FIELD OF THE INVENTION

The invention relates to a search tool for an electronic information resource, which is typically a database of products and services.

BACKGROUND OF THE INVENTION

Many electronic commerce sites on the Internet feature search tools that enable users to search an inventory of products based on the user's feature criteria. These are often called "product finder" or "shopping assistant" tools.

Most such search tools, however, only allow the user to communicate a small number of different types of criteria for each feature, as described below.

Most such search tools can be categorized into one of several groups. Each group is described below, with an example of the types of criteria a user is able to communicate with each group of search tool:

i. Product Filtering Tools.

A method that tools of this kind commonly use to allow a user to express their criteria regarding a feature such as "brand" is to enable the user to select desired brands from a list of brands that products could have for the product category in question.

This method, however, only allows the user to communicate a small number of different types of criteria, such as, "Nikon, Olympus, and Canon are perfectly acceptable to me, and Fujifilm, Pentax, Kodak, Vivitar and Uniden are completely unacceptable to me."

A method that tools of this kind commonly use to allow a user to express their criteria regarding a feature such as "megapixels" is to enable the user to input or select a minimum and a maximum desired value.

This method, however, only allows the user to communicate a small number of different types of criteria, such as, "Anything between 5 and 8 megapixels is perfectly acceptable, and anything less than 5 or more than 8 megapixels is completely unacceptable."

ii. "Unimportant to Important" Tools.

A method that tools of this type commonly use to allow a user to express their criteria regarding a feature is to allow the user to rate the importance of each feature, with or without combining such ratings with a minimum and/or maximum value.

This method, however, only allows the user to communicate a small number of different types of criteria, such as, "Megapixels is generally important (or unimportant) to me", or "It's important for me to have 6 megapixels".

iii. "Customer type" or "Intended Usage" tools, where the user is asked what type of customer they are and/or what type of application they intend to use the product for, and "Feature keyword" tools, that may enable users to enter words associated with features they desire.

Such tools, however, generally do not enable the user to enter specific criteria with respect to specific features.

There is, however, a large variety of different types of criteria that a user may have regarding any given feature, as illustrated by the examples below:

"I like Nikon, Olympus, and Canon, but other brands may be acceptable as well. Fujifilm and Pentax are less desirable, but potentially acceptable. Kodak and Vivitar would be a serious problem for me, but I don't want to exclude products based solely on that. Uniden is unacceptable, though."; or "I don't care about brand, unless the brand is Nikon, which would be a 'bonus' to me."; or "Certain brands are more desirable, and others less so, and, overall, brand is of only moderate important in my purchase decision."; or "I'm expecting the camera I buy to have about 5 megapixels. 6 is more than I need but would be really nice to have, and I would be unhappy with 4. I won't even consider a camera that has 3 megapixels."; or "I want the camera I buy to have at least 6 megapixels. 5 would be less desirable, and 4 or less would be very problematic, but not reason enough for me to not buy a particular model."; or "I want the camera I buy to have close to 6 megapixels. Less than 5 is unacceptable. I've heard that higher-megapixel cameras distort images, however, so 7 is less desirable than 6, and 8 or more is very unappealing.", etcetera.

Even though users may frequently have criteria of these types and many other types, search tools of the types described above may not allow the user to communicate any of these types of criteria accurately.

The frequency with which users may be unable to accurately communicate their feature criteria may cause a cascade of problems with the search tool, since searching, ranking and/or presentation of results or recommendations may be based on an inaccurate understanding of the user's initial feature criteria.

SUMMARY OF THE INVENTION

The present invention relates to a method, system and computer software product for enabling a user to enter feature criteria with a high degree of accurately, and for searching for products and/or services based on a user's preferences regarding various potential attributes of the products and services. Representative examples of some potential attributes include, but are not limited to:

i. a specific price or range of prices (e.g. $25.99 or $10.00-$20.00),
ii. gas mileage, (e.g. 15 miles per gallon)
iii. square footage (e.g. 2500 square feet), and
iv. version number (e.g. USB 2.0).

In accordance with a broad aspect, there is provided a graphical user interface for a search tool for an electronic information resource containing information about products and/or services, the graphical user interface comprising: an attributes area containing two or more potential attributes of a product or service; a scale bounded on a first end by a first descriptor for a potential attribute of a product or service that is so unsatisfactory that a user may eliminate as a viable option any product or service having that attribute, based on the product or service having that attribute alone, and on a second end by a second descriptor for a potential attribute that is so desirable that a user may select a product or service based on the product or service having that attribute alone; and one or more indicators enabling a user to associate a potential attribute with a point along the scale.

In some embodiments, the one or more indicators enable a user to associate a potential attribute with a point anywhere along the scale.

In some embodiments, the scale is divided into two parts, a first part containing increasingly negative descriptors from a point on the scale to the first end, and the second part containing increasingly positive descriptors from said point to the second end.

In some embodiments, the potential attributes comprise one of a numerical attribute and a multiple possibilities attribute, or a combination of types.

In some embodiments, the product or service is a product or service for purchase.

In some embodiments, the potential attributes are associated with a feature of the product or service.

In another broad aspect, there is provided a computer implemented method of searching an electronic information resource containing information about products and/or services, the method comprising: displaying a graphical user interface, the graphical user interface having an attributes area containing two or more potential attributes of a product or service; and a scale bounded on a first end by a first descriptor for a potential attribute of a product or service that is so unsatisfactory that a user may eliminate as a viable option any product or service having that attribute, based on the product or service having that attribute alone, and on a second end by a second descriptor for a potential attribute that is so desirable that a user may select a product or service based on the product or service having that attribute alone; enabling a user to associate a potential attribute with a point along the scale; processing the user input.

In some embodiments, the method further comprises displaying on a display device the information concerning the one or more products or services.

In some embodiments, the electronic information resource comprises a real estate database.

In some embodiments, the electronic information resource comprises a database of consumer merchandise.

In some embodiments, the electronic information resource comprises a travel database.

In some embodiments, the method is implemented by a website.

In yet another aspect, there is provided a computer-readable medium having stored thereon computer-executable instructions for a search tool for an electronic information resource, the code configured to: display a graphical user interface, the graphical user interface having an attributes area containing two or more potential attributes of a product or service; a scale bounded on a first end by a first descriptor for a potential attribute of a product or service that is so unsatisfactory that a user may eliminate as a viable option any product or service having that attribute, based on the product or service having that attribute alone, and on a second end by a second descriptor for a potential attribute that is so desirable that a user may select a product or service based on the product or service having that attribute alone; enable a user to associate a potential attribute with a point along the scale; process the user input.

BRIEF DESCRIPTION OF THE DRAWINGS

Various embodiments of the invention will now be described with reference to the attached drawings in which:

FIG. 6 is a representative screen shot illustrating an alternative means for presenting products in accordance with one embodiment of the present invention.

DETAILED DESCRIPTION OF THE EMBODIMENTS

For the purpose only of illustrating some aspects of the present invention, the embodiment described below refers to a hypothetical use of assisting users in searching for and evaluating houses on an Internet-based site that contains a database of houses for sale, as well as the features of each house in the database. This example does not imply any limitation of the applicability of the invention. For example, the invention is not restricted to being used for searching for any specific type of product or service or to searching for products or services, is not limited to assisting users in making decisions of a purchasing nature, is not limited to deployment on Internet-based systems, and does not assume that product attribute data is already present in a target application of the invention.

More specifically, though the description below makes frequent reference to "products and services", the scope of the invention is not so limited. The invention has broad applicability, and is not limited to facilitating product search and evaluation processes for purchases alone.

The invention can be used to assist a user to search, evaluate, and/or select anything capable of being chosen, including but not limited to a mortgage, a person to date, a job opportunity, a stock, a travel opportunity, or any other item or opportunity capable of being chosen by a user from two or more alternatives.

In some embodiments, a searchable electronic information resource may be created in an electronic information resource that contains some or all the following information: i. product names (e.g., "Nikon L3", "John Smith"), ii. feature names (e.g., weight, type of battery), iii. feature types (i.e. numerical or multiple possibility), iv. potential attributes and/or product attributes (e.g. 10 megapixels, 8 megapixels, 6 megapixels, etc.).

Figure 1:
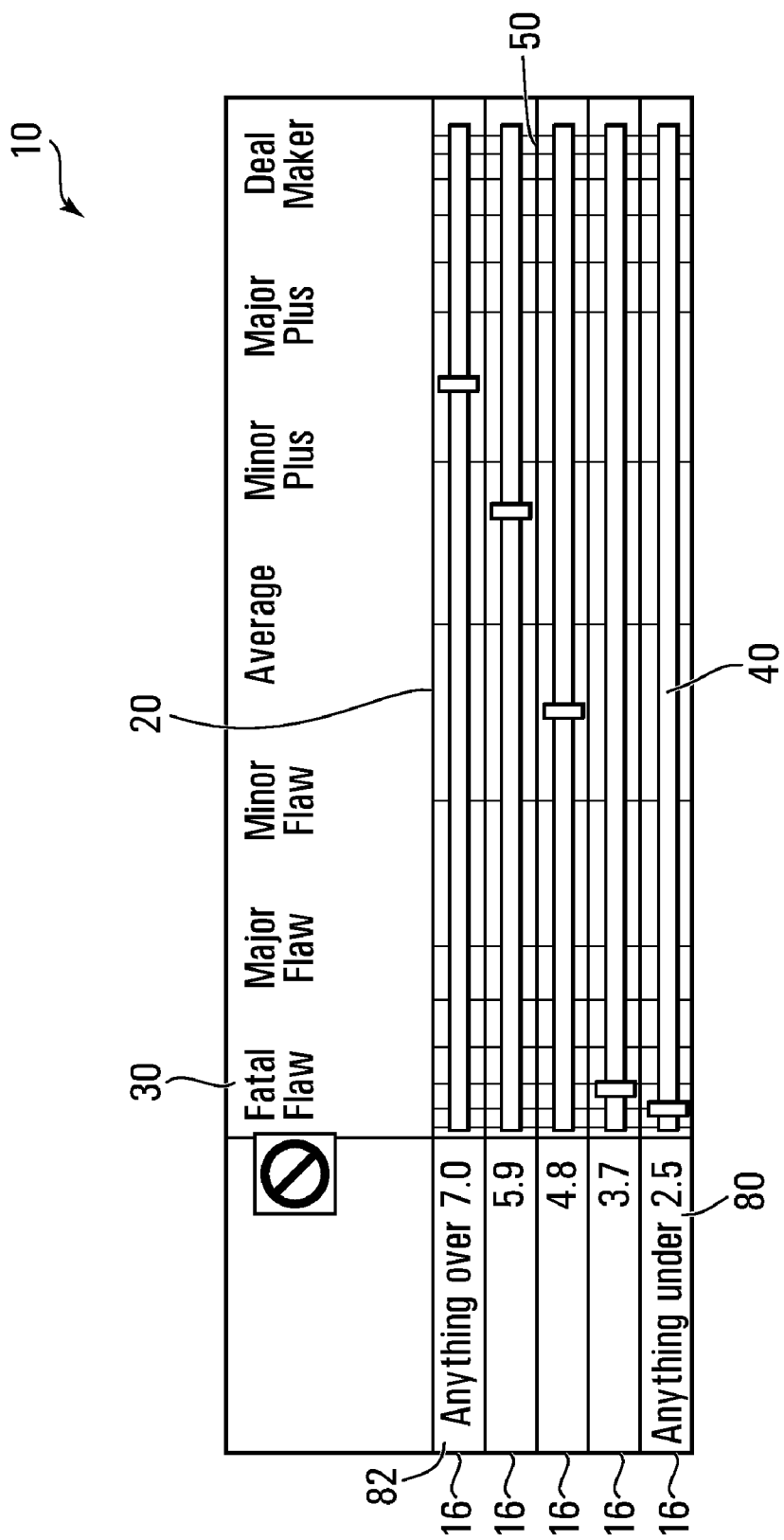
FIG. 1 is an illustration of an exemplary user interface of a search tool according to one embodiment of the present invention.

FIG. 1 is an illustration of an embodiment of a user interface 10 for enabling a user to input preferences and/or needs where the feature of the product or service being considered is a numerical feature. In this example, FIG. 1 relates to the hypothetical numerical feature "size, in square meters, of powder room".

Figure 3:
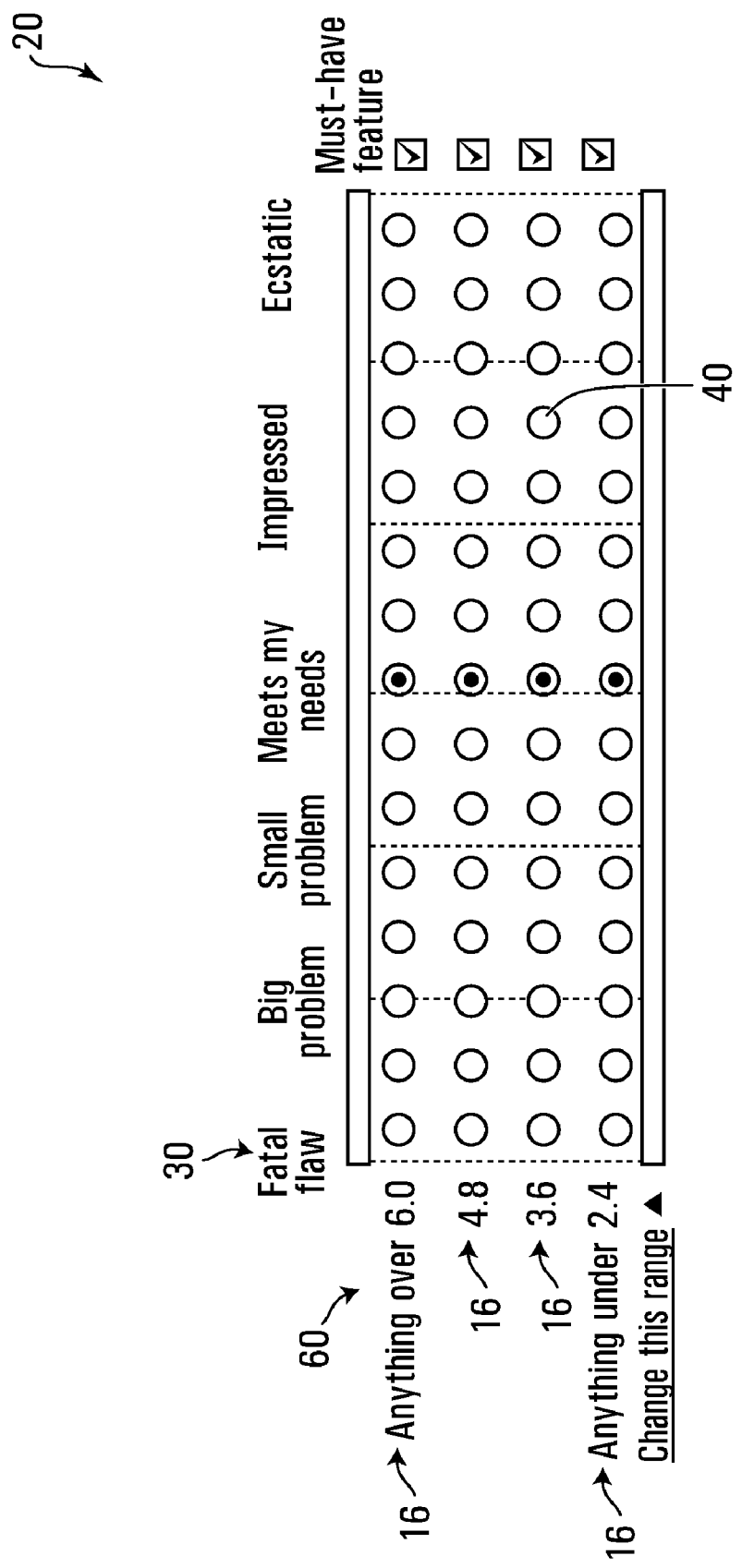
FIG. 3 is an illustration of an additional exemplary user interface of a search tool according to one embodiment of the present invention.

User interface 10 can be used by a user to input his/her feeling toward potential attributes of a feature of a product and/or service. User interface 10 is comprised of one or more of the following elements:

i. a scale 20 bounded on one end by a first descriptor, that descriptor being a term, symbol or other representation such as "Fatal Flaw" (or "Deal Breaker" not shown) denoting a potential attribute of a product or service that is so unsatisfactory that a user may eliminate as a viable option any product or service having that attribute, based on the product or service having that attribute alone. On the other end, scale 20 is bounded by a descriptor, that descriptor being a term, symbol or other representation, such as "Deal Maker" or "Ecstatic", describing a potential attribute so desirable that a user may select a product or service based on the product or service having that potential attribute alone, or denoting the feeling they would have about such an attribute. Scale 20 can be divided into two parts, a first part containing increasingly negative descriptors from a point on the scale to a first end, and the second part containing increasingly positive descriptors from the point to a second end. As illustrated in FIG. 1 and FIG. 3, negative user preference values can be labeled, inter alia, "Major Flaw" or "Minor Flaw" or "Small problem" or "Big problem" or "Somewhat disappointed" (not shown) or "Very disappointed" (not shown). Similarly, positive descriptors can be labeled, inter alia, as "Minor Plus" or "Major Plus" or "Impressed" or "Ecstatic".

ii. a user input element 40 for enabling the user to associate each potential attribute with a point on the scale. As shown in this embodiment, there are one or more indicators enabling a user to select a point anywhere along the scale in accordance with the user's preference for each potential attribute, though this is not essential.

iii. a potential attributes area 60 containing one or more potential attributes 16 of a product or service that may be associated with a feature. In FIG. 1, potential attributes area 60 contains potential attributes which are numerical. In this case, the potential attributes 16 available for the user to rate are "anything under 2.5", "3.7", "4.8", "5.9", and "Anything over 7.0." As more fully described below, the potential attributes area can include one or more potential attributes 16 which are either numerical attributes, or multiple possibilities attributes. In FIG. 1, potential attributes 16 are numerical.

In one embodiment, potential attributes 16 may be numbers, e.g. representing the potential number of electrical outlets in an house, the number of bathtubs in a house, etc.

Depending on the nature of the product, service, or the feature with which potential attributes are generated, numerical potential attributes may be automatically generated as described in more detail below.

In one embodiment, user preferences are input into the user input element 40 on a continuous scale which in FIG. 1 is slider bar. User input element 40 enables a user to input an intermediate position between and including the two aforementioned extremities, and that generates a user preference value corresponding to the position the user has input.

In some embodiments, slider handle 40 moves back and forth along axis 50. The user positions slider handle 40 in the location along axis 50 which is most closely associated with the position along scale 20 which matches the user's feeling toward that potential attribute. Though slider handles 40 are not essential to the operation of the present invention, they can be useful because they are highly visual and users cannot enter invalid values.

User preference values are then assigned to each potential attribute which are a value from a specified range, such as number from −10 to +10, based upon the positions of the slider handles 40 set by the user. In one embodiment, user preference values along scale 20 can correspond to −10 for input at the least desirable extremity of scale 20, to 0 at the midpoint of scale 20, and to +10 for input at the most desirable extremity of scale 20.

In FIG. 1, there is an illustrated example of a user interface 10 where a user has indicated a strongly positive preference for a "powder room" with an area greater than 7 square meters. The user also has a positive preference for a powder room with an area of 5.9 square meters, though not has high a preference as "anything over 7.0" square meters. The user has expressed a negative preference for an area of 4.8 meters, and an even lower preference for an area of 3.7 meters. In this case, the user has expressed that any house with a powder room with an area less than 2.5 meters constitutes a "fatal flaw".

The above described user interface 10 is only one example of the invention. One skilled in the art would appreciate that other forms of displaying user preferences and potential attributes may also be used without departing from the scope of the invention. For example, there is no requirement that potential attributes area 60, scale 20 and user input area 40 be distinct from each other in rectangular shape. As well, there is no requirement that a slider bar be used. As long as a user can associate a potential attribute with a point along scale 20, there is no need for a user interface which bears any resemblance to that shown in FIG. 1.

Figure 2:
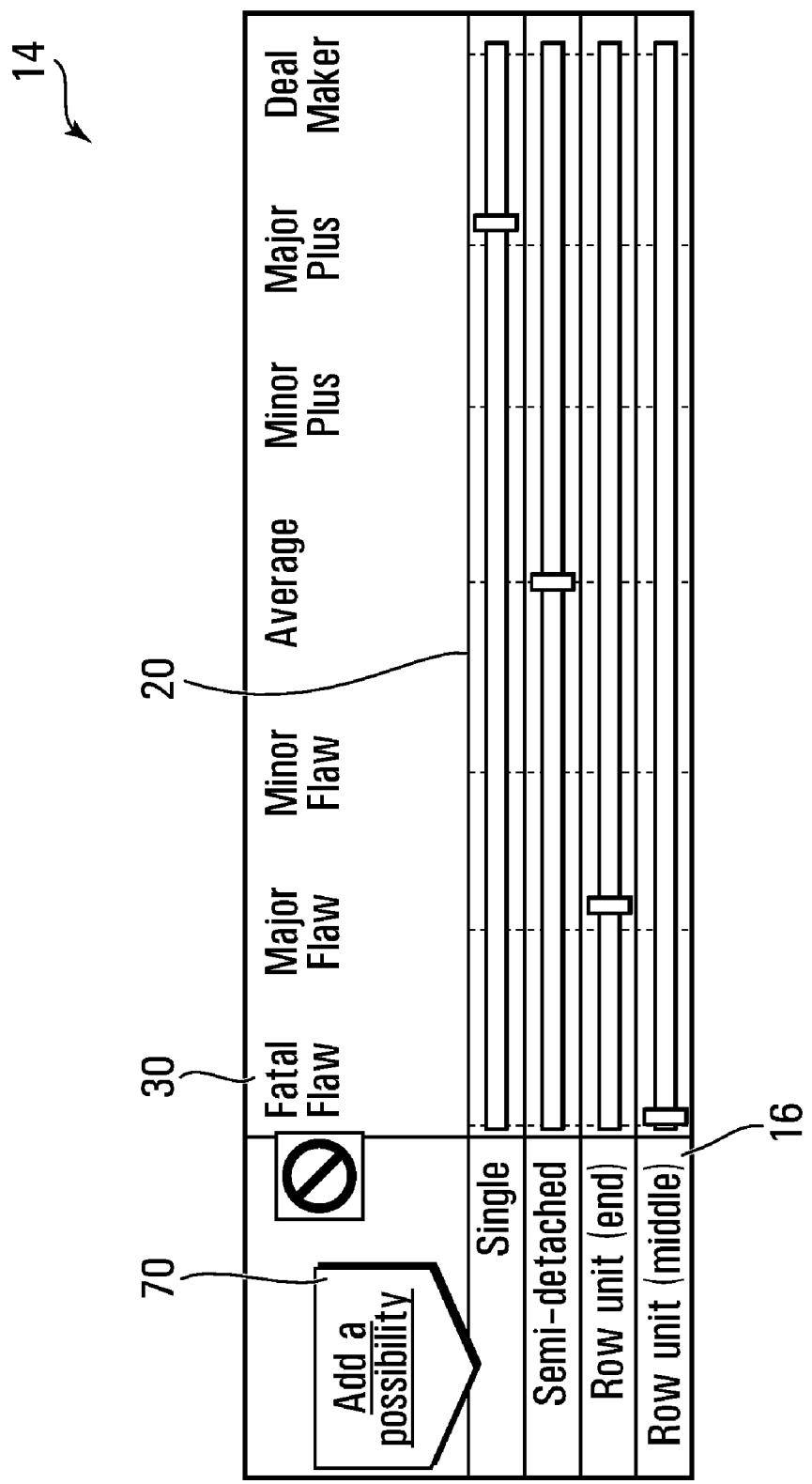
FIG. 2 is an illustration of an additional exemplary user interface of a search tool according to one embodiment of the present invention.

FIG. 2 is an illustration of an embodiment of a user interface 12 for enabling a user to input preferences and needs regarding a multiple possibilities feature. A multiple possibilities feature may be a feature that is typically described as being one of several possible options, for example: USB version (i.e. 1.0, 1.2, 2.0), inclusion of cruise control (yes, no), language of instruction manual (English, Spanish, French), etc.

FIG. 2 relates to the hypothetical multiple possibilities feature "type of house". As such, the potential attributes area 60 includes "row unit (middle)", "row unit (end)", "semi-detached", and "single". These potential attributes may be derived from the available product attributes in the electronic information resource. A tool 74 can be used to add a new possibility to the list.

Potential attributes 16 may be ordered from what is generally considered most desirable to that which is generally considered least desirable.

In FIG. 2, a "single" home is considered by the user to be the most preferred, while a "row unit (middle)" is considered to be a fatal flaw. The user has a feeling that is neither positive nor negative toward "semi-detached unit", while a "row unit (end)" is considered to constitute almost a major flaw.

In some embodiments, the user may be given the option to increase and/or decrease the number of potential attributes being presented by using an input button 70 such as that shown in FIG. 2. In the case of numerical features, any potential attribute numbers which are automatically generated may be computed by increasing or reducing the intervals between the maximum and minimum potential attributes.

In some embodiments, a user may be presented with the name of each unique feature in the aforementioned database, from which they may select. If a feature is selected by the user is of a numerical type, an information query and retrieval system may display a user interface 10 similar to that illustrated in FIG. 1. If the selected Feature is of multiple possibility type, a user interface 12 similar to that illustrated in FIG. 2 may be displayed to the user.

In some embodiments, if the feature being presented is of a numerical type, the values in the potential attribute area 60 may be automatically generated for the purpose, inter alia, of enabling a user to more accurately express their preferences regarding numerical features. Intermediate potential attributes can be generated by determining three values that are at intervals between the minimum and maximum potential attribute values, and presenting these to the user, along with the maximum and minimum values. Intermediate potential attributes may also be derived from specific values in the electronic information resource. Values may be presented to the user ordered from what is generally considered to be the most desirable number for that feature, followed by three values representing numbers found at intervals between the most desirable and least desirable numbers, followed by what is generally considered to be the least desirable number.

In some embodiments, the maximum potential attribute may have a qualifier associated with it, such as "Anything over . . . ", denoting that a point on the scale associated with that potential attribute by the user will also be associated with any product attributes that are greater than the maximum potential attribute. See cell 82 in FIG. 1 for an example.

In some embodiments, the minimum potential attribute may have a qualifier associated with it, such as "Anything under . . . ", denoting that a point on the scale associated with that potential attribute will be also be associated with any product attributes that are lesser than the minimum potential attribute. See cell 80 in FIG. 1 for an example.

In some embodiments, the user may be able to alter the maximum and/or minimum values for the purpose, inter alia, of communicating their feature requirements with greater precision.

In some embodiments, the aforementioned process may be repeated for some or all other potential attributes stored in the electronic information resource.

In some embodiments, a color scheme may be used to emphasize the meaning of each of the descriptors on the scale. For example, the scale may be colored from red at the "Fatal flaw" extremity, to white in the middle, to green at the "Deal maker" extremity.

In some embodiments, the user preference value is a value where 0 corresponds to the mid-point of the scale, a positive number (e.g. +10) corresponds to the "Deal maker" extremity of the scale, and an equivalent negative number (e.g. −10) corresponds to the "Fatal flaw" extremity of the scale, and other values correspond to their equivalent positions on the scale. For example, a position that is midway between the "Fatal flaw" extremity and the midpoint of the scale may correspond to a user preference value of −5.

FIG. 3 is an illustration of an additional exemplary user interface 16 of a search tool according to one embodiment of the present invention. User interface 16 can be used by a user to input his/her feeling toward a potential attribute of a feature of a product and/or service. User interface 16 is comprised of one or more of the following elements:

i. a scale 20 bounded on one end by a first descriptor, that descriptor being a term, symbol or other representation such as "Fatal Flaw" (or "Deal Breaker" not shown) describing a potential an attribute of a product or service that is so unsatisfactory that a user may eliminate as a viable option any product or service having that attribute, based on the product or service having that attribute alone. Other the other end, scale 20 is bounded by a descriptor, such descriptor being a term, symbol or other representation such as "Deal Maker" describing a potential attribute so desirable that a user may select a product or service based on that product having that potential attribute alone. As illustrated in FIG. 3, intermediate negative user preference values can be labeled "Big Problem" or "Small Problem". Similarly, intermediate positive user preference values can be labeled as "Impressed" or "Ecstatic".

ii. a user input element 40 for enabling the user to associate a potential attribute with a point on the scale. As shown in this embodiment, there are one or more indicators enabling a user to select a point along the scale in accordance with the user's toward each potential attribute. By contrast with FIG. 1, a user may not select a point anywhere the scale.

iii. a potential attributes area 60 containing two or more potential attributes 16 of a product or service.

Figure 4:
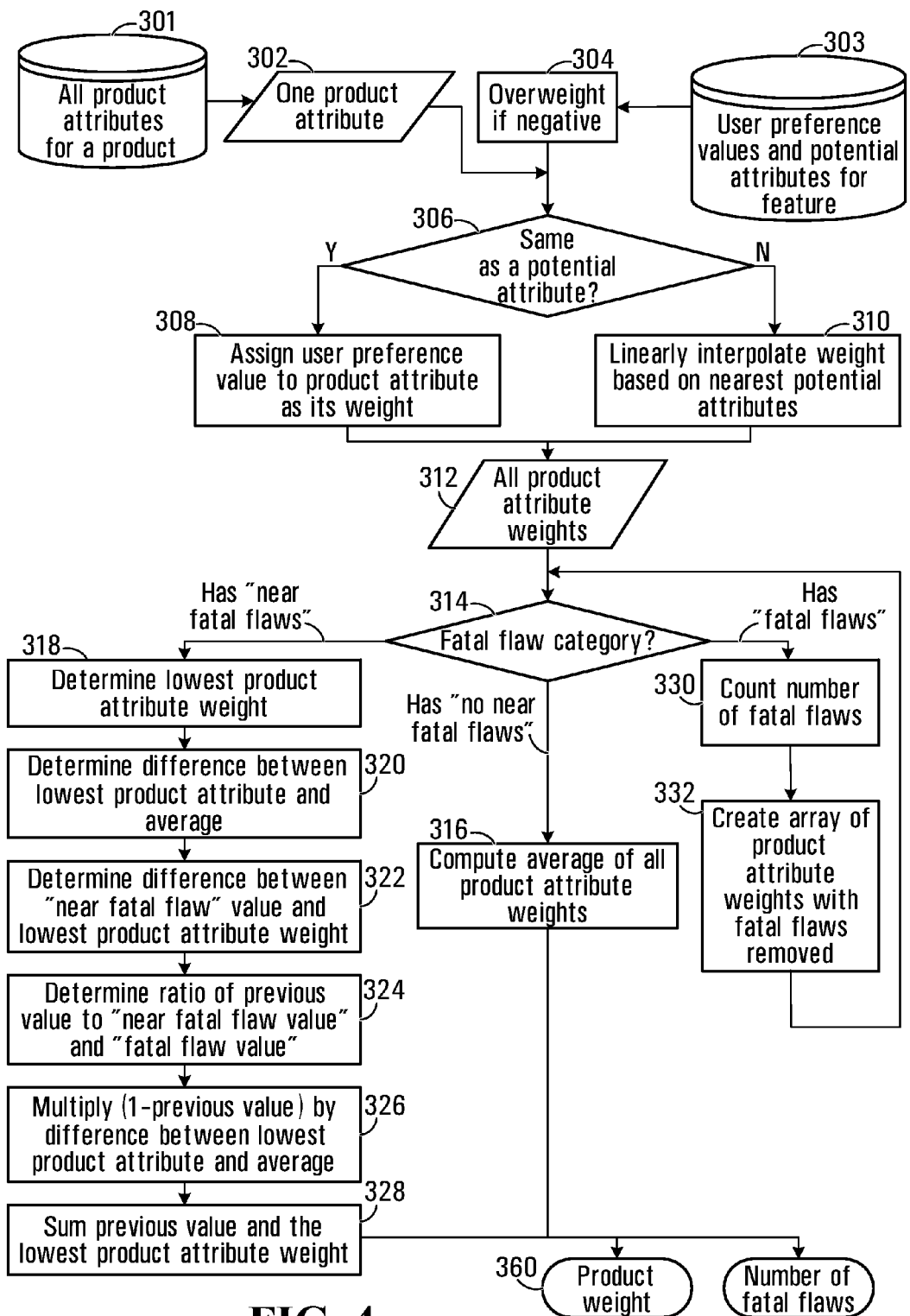
FIG. 4 is a flowchart of a method for determining product weights in accordance with one embodiment of the present invention.

FIG. 4 is a flowchart of a method for determining product weights in accordance with one embodiment of the present invention. Though the description below only makes reference to "products", the description applies equally well to services, or any other item, person or opportunity capable of being chosen by a user.

In some embodiments, a product weight may be computed based on the user preference values, adjusted user preference values and product attributes, using a method such as the one illustrated in FIG. 4 and described below.

In FIG. 4, database 301 contains information pertaining to product attributes for a product. Database 303 contains user preference values for potential attributes for a feature. These values are collected from the user using a user interface which may be the one shown in FIG. 1. At step 302, one product attribute is selected.

At step 304, an overweighting function is performed if the product attribute selected is negative. In some embodiments, negative user preference values may be over-weighted prior to any weighting computations, such that negative values are adjusted to be somewhat lower than the values at corresponding positions on the positive end of the scale. For illustrative purposes only, a negative user preference value can be increased by 25% (e.g., a "−5" on scale 20 in FIG. 1 becomes "−6.25"). This calculation results in an adjusted user preference value.

In some embodiments, each one of a product's attributes may be assigned product attribute weights in the following manner. At step 306, a comparison is made between a product attribute and a potential attribute which had been assigned a user preference value by the user. If they are the same, at step 308, the adjusted user preference value is associated with the product attribute as its corresponding product attribute weight.

If a product attribute is not the same as one of the potential attributes that has been assigned a user preference value by the user, the product attribute weight may be computed at step 310 by linearly interpolating a value between the potential attributes between which the product attribute falls. In the case where the product attribute falls outside of the range of potential attributes, the adjusted user preference value of the nearest potential attribute may be used as that product attribute's product attribute weight.

All of the product attribute weights are collected at step 312.

At step 314, a decision is made as to whether a product's product attribute weights cause it to fall into one of three categories: "Has no near fatal flaws", (a fatal flaw being an attribute of a product or service that is so unsatisfactory that a user may eliminate as a viable option any product or service having that attribute, based on the product or service having that attribute alone), where none of the adjusted product attribute weights are close to a fatal flaw value (e.g. below −10), "Has near fatal flaws", where at least one product attribute weight is close to the fatal flaw value (e.g. between but not including −10 and −12.5), and "Has fatal flaws", where at least one product attribute weight equals the fatal flaw value (e.g. −12.5).

If a product can be categorized as "Has no near fatal flaws", its product weight may be computed at step 316 by determining the average of all of the adjusted product attribute weights that are associated with that product. The product weight is then output at step 360.

If a product can be categorized as "Has near fatal flaws", its product weight may be computed by the following method:

At step 318, determine the lowest adjusted product attribute weight associated with the product to be weighted.

At step 320, determine the difference between the lowest adjusted product attribute weight and the average of all adjusted product attribute weights.

At step 322, determine the difference between the point at which an adjusted product attribute weight is considered a "near fatal flaw" (e.g. −10) and the lowest adjusted product attribute weight.

At step 324, determine the ratio between the value computed in step 3 and the difference between the point at which an adjusted product attribute weight is considered to have a near fatal flaw (e.g. −10) and the fatal flaw value (e.g. −12.5).

At step 326, multiply 1 minus the ratio computed in step 4 by the value computed in step 2.

At step 326, sum the value computed in step 326 with the lowest adjusted product attribute weight.

If a product can be categorized as "Has fatal flaw(s)", its product weight may be computed by the following method:

At step 330, count the number of adjusted product attribute weights that are equal to the fatal flaw value (e.g. −12.5).

At step 332, create an array of values that includes all of the adjusted product attribute weights associated with the product to be weighted, except for any that are equal to the fatal flaw value (e.g. −12.5).

Return to step 314 to process the array from step 332 using the aforementioned computations.

In summary, all the other adjusted product attribute weights are reduced in proportion to how close the lowest adjusted product attribute weight is to actually being a fatal flaw, assuming the lowest value is close to being a fatal flaw. For example, if the lowest adjusted product attribute weight for a product is −12.4 (and a fatal flaw is −12.5), all the other adjusted product attribute weights for that product will be reduced to nearly nothing in terms of the effect they have on the overall product weight, producing a product weight that will be close to −12.5, even if the other adjusted user preference values were very positive. If the lowest value were −9 (and a fatal flaw is −12.5), however, the impact would be much less, and the overall product weight would be more similar to an average of all of the product attribute weights for that product.

From the user's perspective this means that if a product has one or more "nearly fatal flaws", all the other characteristics of that product get "dragged down" significantly in terms of their effect on product ranking. The closer a "nearly fatal flaw" is to actually being a fatal flaw, the more the other characteristics get "dragged down".

The other attributes are still used to rank products that have fatal flaws, but these may be ranked lower than products with no fatal flaws in a ranking presented to users.

The above described method is only one example for dealing with product attribute weights. One skilled in the art would appreciate that other methods may also be used without departing from the scope of the invention.

In one embodiment, products are assigned product weights for the purpose of, inter alia, sorting them in a medium such as a database, according to the "quality of choice" of each product, such that products that would be a poor choice based on the user's criteria are sorted below products that would be better choices for the user, based again on their criteria.

Products are then presented to a user. In one embodiment, the product attributes of each product are displayed to the user with their associated adjusted user preference values as a quantity graph (e.g. a bar of proportional length to the adjusted user preference), number or similar indicator for the purpose, inter alia, of highlighting the ways in which a product exceeded, met, or fell below the user's expectations. In some embodiments, products may be presented to the user, sorted according to each product's number of fatal flaws, then according to each product's product weight. In some embodiments, the adjusted user preference values are presented as color-coded elements (e.g. red representing lower values, and green representing higher values).

Figure 5:
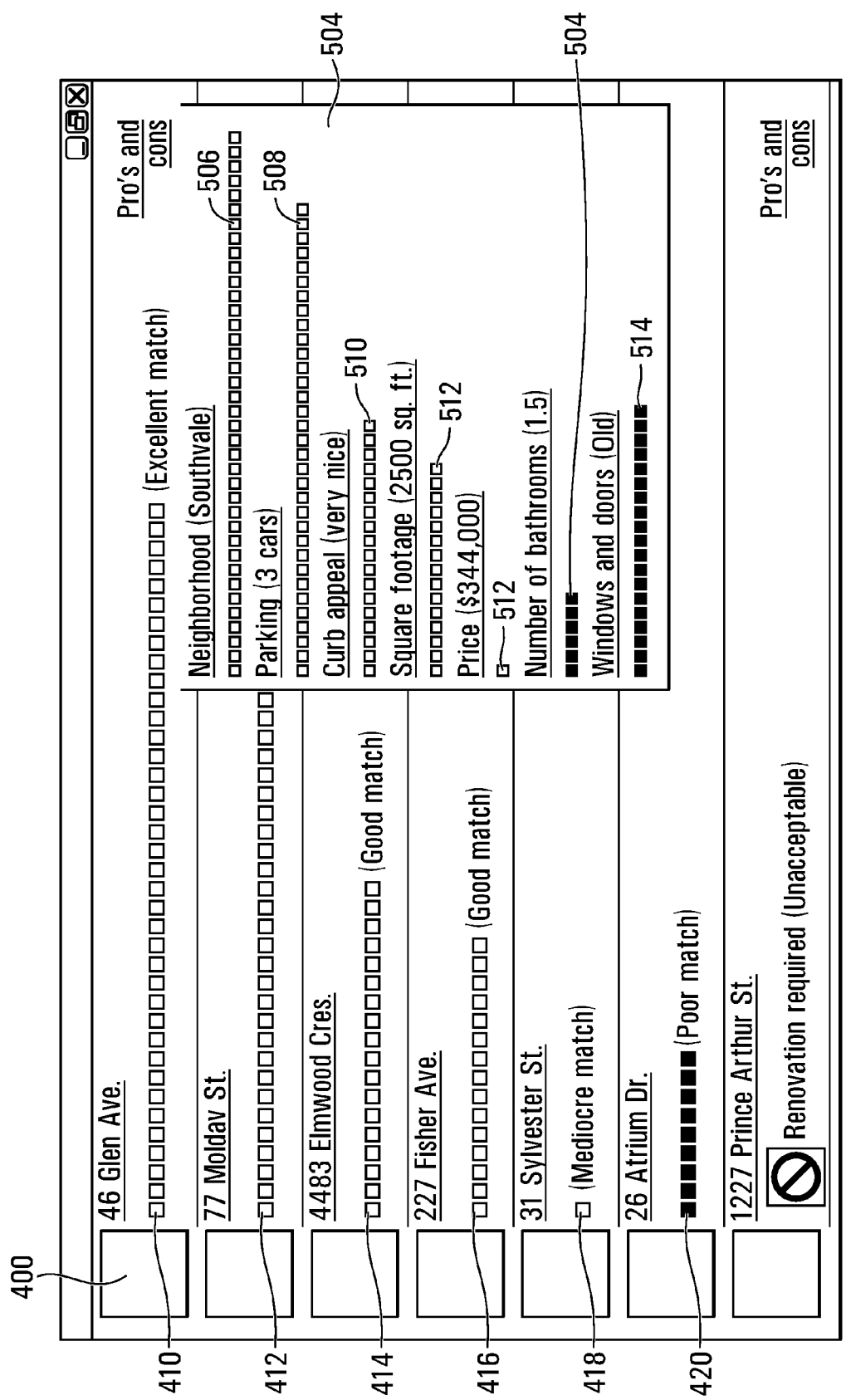
FIG. 5 is a representative screen shot illustrating a means for presenting products with product weights in accordance with one embodiment of the present invention.

FIG. 5 illustrates a means for presenting products in accordance with one embodiment of the present invention. In this case, the products under consideration by a user include seven homes 400, the addresses of which are "46 Glenn Ave.", "77 Moldav St.", etc. In FIG. 5, which comprises a list view of the products, product weights are illustrated as bars 410, 412, 414, 416, 418, 420, 422, 424 and 426, their respective length and color indicating a more negative or more positive product weight.

As illustrated, in this embodiment, a product weight of +7 to +10 would be an excellent choice, +5 to +6.999 would be a very good choice, +2 to +4.999 would be a good choice, −2 to +1.999 would be a neutral choice, −2.001 to −5 would be a mediocre choice, −5.001 to −10 would be a poor choice, and less than −10 would be a very poor choice. Of course, the assignment of these labels to different product weights is wholly arbitrary and would likely vary depending on the embodiment.

In some embodiments, the product weight associated with each product may be presented to the user, in any representation that indicates the quantity of the product weight, such as a number, colour or graphical shape.

In FIG. 5, the property at 46 Glenn Ave. has been assigned the highest product weight and therefore bar 410 is displayed to the user in a color and length indicating that this is the best choice among all alternatives considered. The property at 77 Moldav St. is the second best choice, and therefore bar 412 is displayed to the user in a manner relative to bar 410 which indicates it is not as good a choice. By contrast, the property at 26 Atrium is a much worse choice and therefore bar 420 is displayed to the user in a color and length indicative of the degree to which it is a bad choice based on the user's criteria.

Labels such as "excellent match" and "very poor choice" can be added to enable aid the user in better understanding the meaning of the product weights, or their graphical representations.

In this embodiment, the properties at 1227 Prince Arthur Rd., 10 Tecumseh Dr., and 144 St. Mary St. are all ranked lower than products with no fatal flaws, even if their calculated product weight is higher than other products with no fatal flaws.

In the example shown in FIG. 5, the house at 46 Glenn Avenue has the highest product weight and is therefore ranked first. The product attributes (e.g. neighbourhood, parking spots, curb appeal, etc.) are shown with their associated adjusted user preference values 12, 13. By contrast, the house shown at 1227 Prince Arthur Street contains a "fatal flaw" (which in this case is the fact that renovations are required). Therefore, this product is unacceptable and is ranked after the products with no fatal flaws. As noted above, a product's other attributes are still used to rank products that have fatal flaws, but products containing fatal flaws may be ranked lower than products without fatal flaws.

FIG. 6 is a representative screen shot illustrating an alternative means for presenting products in accordance with one embodiment of the present invention. In this embodiment, the product attribute weight associated with each product attribute for a product may be presented to the user in any representation that indicates the quantity of the product attribute weight, such as a number, colour or graphical shape.

In FIG. 6, a panel 504 can be used to display the various adjusted attribute weights calculated for each attribute of a product. In this case, the attributes include "Neighbourhood (Southvale)" which has a very positive adjusted product attribute weight shown by bar 506, "Parking (3 cars)" which also has a less positive, though still very positive weight shown by bar 508, and "Curb appeal (very nice)" which has an even less positive, though still overall positive adjusted attribute weight shown by bar 510. "Square footage (2500 sq. ft.)" and "Price $344,000)" have also have positive adjusted attribute weights shown by bars 512 and 513.

With regard to "Number of bathrooms (1.5)", this product attribute has a negative adjusted attribute weight which is indicated by bar 504 which may be in a different color than bars 506, 508, 510, 512, and 513.

Similarly, "Windows and doors (Old)" also has a negative adjusted attribute weight which is indicated by bar 514. In this case, the negative adjusted attribute weight for "Windows and doors (Old)" is greater than the negative adjusted attribute weight for Number of bathrooms (1.5).

Overall, window 502 shown in this embodiment provides an easy to understand visual representation of the various components going into the overall product weight exemplified by bar 410, and of the attributes of a product toward which the user is likely to have positive and/or negative feelings.

In some embodiments, a user can add their own features, product attributes and/or potential attributes to a database that makes use of the invention, wherein user-added features, product attributes and/or potential attributes are considered by the weighting processes herein as being the same as features, product attributes and/or potential attributes that may have already been present in the database.

Figure 7:
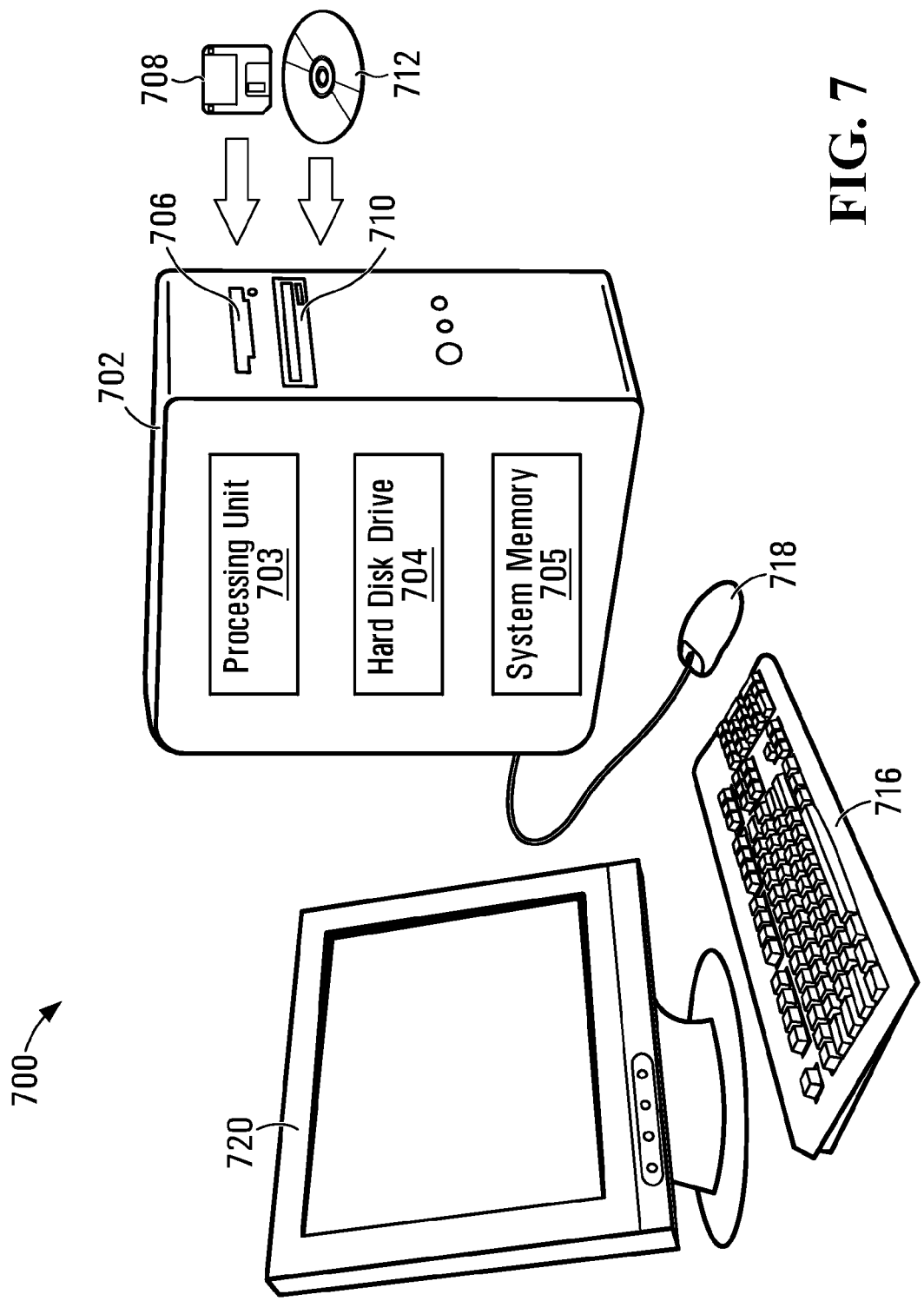
FIG. 7 is a schematic diagram of a conventional personal computer which can be used to run software programs embodying the present invention.

As shown in FIG. 7, an exemplary system 700 for implementing the invention includes a general purpose computing device 702 in the form of a conventional personal computer or server or the like, including a processing unit 703, and a system memory 705. The personal computer 702 may further include a hard disk drive 704, a magnetic disk drive 706 for reading from or writing to a removable magnetic disk 708, and an optical disk drive 710 for reading from or writing to a removable optical disk 712 such as a CD-ROM or other optical media. The drives and their associated computer-readable media provide non-volatile storage of computer readable instructions, data structures, program modules and other data for the personal computer or server. Other types of computer readable media which can store data that is accessible by a computer can also be used.

A user may enter commands and information into the personal computer through input devices such as a keyboard 716 or a pointing device 718. A monitor 720 or other type of display device is also connected to personal computer 702. Personal computer 702 may operate in a networked environment using logical connections to one or more remote computers.

The electronic information resource containing information about the products and/or services to be searched and computer code that makes use of the invention may be stored on hard disk drive 704 or may be located remote from computing device 702 on a website accessible via the Internet.

A user can use computer software running on personal computer 702 to utilize the methods described above.

Numerous modifications and variations of the present invention are possible in light of the above teachings. It is therefore to be understood that within the scope of the appended claims, the invention may be practiced otherwise than as specifically described herein.

The invention claimed is:

1. A method for use with a system comprising at least one processor and a graphical display for searching an electronic information resource containing information about products and/or services, the method comprising:

displaying, using the processor and graphical display, a graphical user interface, the graphical user interface having a single stage comprising:
a potential attributes area containing two or more potential attributes of a product or service, and for each potential attribute of said two or more potential attributes:
a single, continuous descriptor scale for indicating a user's assessment of the potential attribute without reference to other potential attributes,
wherein the descriptor scale is:
bounded on a first end by a first descriptor representing an assessment that the potential attribute is a fatal flaw, being so unsatisfactory that any product or service having that attribute will be eliminated by the user as a viable option based on having that potential attribute;
bounded on a second end by a second descriptor representing an assessment that the potential attribute is so desirable that it will cause the user to strongly favor any product or service having that potential attribute;
divided into two parts, a first part containing descriptors that are increasingly negative user assessments from an intermediate point on the scale to the first end, and the second part containing descriptors that are increasingly positive user assessments from said intermediate point on the scale to the second end;
wherein the single stage of the graphical user interface permits the user to input the user's assessments regarding the two or more potential attributes without additional graphical user interface stages;
receiving user input associating each potential attribute of said two or more potential attributes with a chosen point along the descriptor scale;
processing, using the processor, the user input, the processing comprising:
for each potential attribute of said two or more potential attributes:
assigning an attribute weight for the potential attribute; and
if the chosen point for the potential attribute is within the first part of the descriptor scale, applying an overweighting function to the attribute weight for the potential attribute; and
for each contemplated product or service of a selection of contemplated products or services, based on the assigned attribute weights:
determining whether attributes of the contemplated product or service cause it to fall into one of three categories: (i) has no near fatal flaws, (ii) has near fatal flaws, and (iii) has fatal flaws; and
assigning a product weight to the contemplated product, wherein the product weight is computed based on a first function if the contemplated product falls into category (i), a second function if the contemplated product falls into category (ii), and a third function if the contemplated product falls into category (iii), and wherein at least two of the first, second, and third functions differ; and displaying, using the processor and graphical display, a list of the contemplated products or services ordered to reflect the user's preferences, the ordering based on at least the product weights of the contemplated products or services and the category the contemplated product falls into.

2. The method of claim 1, wherein at least one of the second or the third function, when evaluating a product weight for a contemplated product, reduces the assigned attribute weights applicable to the contemplated product in proportion to how close the lowest assigned attribute weight applicable to the contemplated product is to being a fatal flaw.

3. The method of claim 1, further comprising enabling the user to associate a potential attribute with a chosen point anywhere along the descriptor scale.

4. The method of claim 1, wherein the potential attributes comprise one of a numerical attribute and a multiple possibilities attribute.

5. The method of claim 1, wherein the product or service is a product or service for purchase.

6. The method of claim 1, wherein the step of processing the user input further comprises accessing the electronic information resource and retrieving information concerning one or more products or services.

7. The method of claim 1, wherein the electronic information resource comprises a real estate database.

8. The method of claim 1, wherein the electronic information resource comprises a database of consumer merchandise.

9. The method of claim 1, wherein the electronic information resource comprises a travel database.

10. The method of claim 1, wherein the method is implemented by a website.

11. A tangible computer-readable medium having stored thereon computer-executable instructions for a search tool for an electronic information resource, the instructions configured to:

display a graphical user interface, the graphical user interface having a single stage comprising:
  a potential attributes area containing two or more potential attributes of a product or service, and for each potential attribute of said two or more potential attributes:
    a single, continuous descriptor scale for indicating a user's assessment of the potential attribute without reference to other potential attributes,
    wherein the descriptor scale is:
      bounded on a first end by a first descriptor representing an assessment that the potential attribute is a fatal flaw, being so unsatisfactory that any product or service having that attribute will be eliminated by the user as a viable option based on having that potential attribute;
      bounded on a second end by a second descriptor representing an assessment that the potential attribute is so desirable that it will cause the user to strongly favor any product or service having that potential attribute;
      divided into two parts, a first part containing descriptors that are increasingly negative user assessments from an intermediate point on the scale to the first end, and the second part containing descriptors that are increasingly positive user assessments from said intermediate point on the scale to the second end;

wherein the single stage of the graphical user interface permits the user to input the user's assessments regarding the two or more potential attributes without additional graphical user interface stages;

receive user input associating each potential attribute of said two or more potential attributes with a chosen point along the descriptor scale;

process the user input by:
  for each potential attribute of said two or more potential attributes:
    assigning an attribute weight for the potential attribute; and
    if the chosen point for the potential attribute is within the first part of the descriptor scale, applying an overweighting function to the attribute weight for the potential attribute; and
  for each contemplated product or service of a selection of contemplated products or services, based on the assigned attribute weights:
    determining whether attributes of the contemplated product or service cause it to fall into one of three categories: (i) has no near fatal flaws, (ii) has near fatal flaws, and (iii) has fatal flaws; and
    assigning a product weight to the contemplated product, wherein the product weight is computed based on a first function if the contemplated product falls into category (i), a second function if the contemplated product falls into category (ii), and a third function if the contemplated product falls into category (iii), and wherein at least two of the first, second, and third functions differ; and display a list of the contemplated products or services ordered to reflect the user's preferences, the ordering based on at least the product weights of the contemplated products or services and the category the contemplated product falls into.

12. The tangible computer-readable medium of claim 11, wherein at least one of the second or the third function, when evaluating a product weight for a contemplated product, reduces the assigned attribute weights applicable to the contemplated product in proportion to how close the lowest assigned attribute weight applicable to the contemplated product is to being a fatal flaw.

13. The tangible computer-readable medium of claim 11, further comprising enabling the user to associate a potential attribute with a chosen point anywhere along the descriptor scale.

14. The tangible computer-readable medium of claim 11, wherein the potential attributes comprise one of a numerical attribute and a multiple possibilities attribute.

15. The tangible computer-readable medium of claim 11, wherein the product or service is a product or service for purchase.

16. The tangible computer-readable medium of claim 11, wherein the processing the user input further comprises accessing the electronic information resource and retrieving information concerning one or more products or services.

17. The tangible computer-readable medium of claim 11, wherein the electronic information resource comprises a real estate database.

18. The tangible computer-readable medium of claim 11, wherein the electronic information resource comprises a database of consumer merchandise.

19. The tangible computer-readable medium of claim 11, wherein the electronic information resource comprises a travel database.

20. The tangible computer-readable medium of claim 11, wherein the method is implemented by a website.

\* \* \* \* \*